April 26, 1938.  E. LUQUE  2,115,029
PROCESS OF MANUFACTURING RAW SUGAR
Filed May 3, 1935
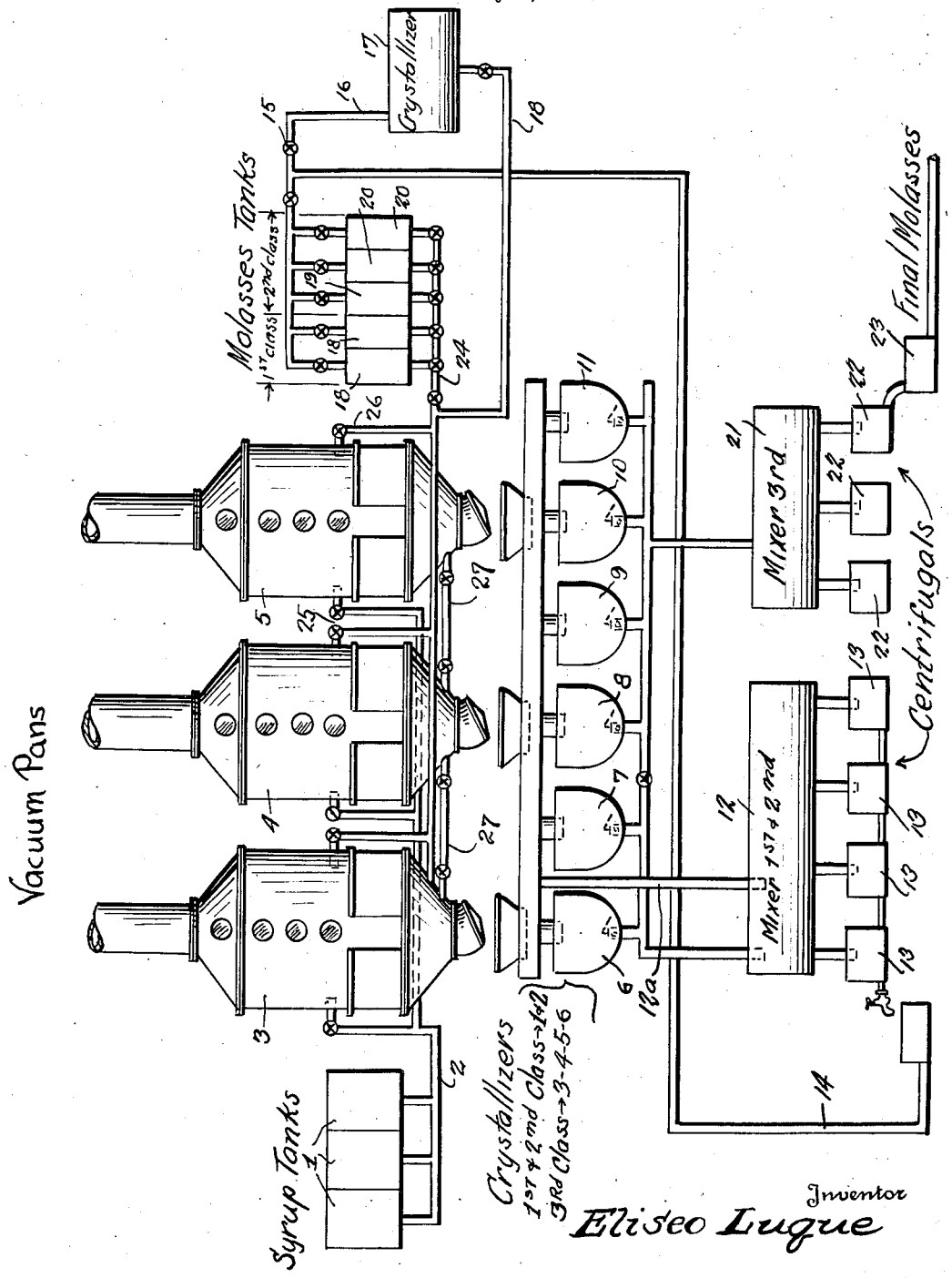
Inventor
Eliseo Luque
By
Attorney Patented Apr. 26, 1938

2,115,029

UNITED STATES PATENT OFFICE 2,115,029

PROCESS OF MANUFACTURING RAW SUGAR

Eliseo Luque, Ponce, P. R., assignor to Luque Sugar Process, Inc., Santurce, P. R., a corporation of Puerto Rico Application May 3, 1935, Serial No. 19,631

2 Claims. (Cl. 127—60)

The present invention relates to improvements in the process of manufacturing raw sugar. More specifically the present invention relates to improvements in the crystallization of raw sugar from the juice or syrup extracted from sugar cane and sugar beets.

As those fully acquainted with modern practice in manufacturing raw sugar from sugar cane are aware, the principal steps in the manufacture of raw sugar are, after the sugar cane crop has been harvested, to first crush, grind and mill the sugar cane to obtain a rather dilute solution of sucrose with some or all of those impurities associated with the sucrose in the water, and bagasse; second to strain and clarify such sucrose solution to remove a large portion of said impurities; third, concentrate such clarified sucrose solution by evaporation of water; and fourth, to crystallize the sugar or sucrose from the concentrated syrup to form raw sugar and molasses and to separate and recover these products.

As indicated previously herein, the present invention relates to the fourth step as given above, viz., to improvements in the method of causing the raw sugar to crystallize from the concentrated syrup solution and to recover the raw sugar. An important phase of the present invention is that crystallization of sucrose is induced by "seeding" a quantity of hot supersaturated sugar solution with a relatively smaller quantity of magma consisting of very minute sugar crystals and molasses, and subsequently cooling the sugar solution, whereupon crystallization ensues.

The advantages of the present process are: increased yields of raw sugar from a given quantity of original sugar syrup, over the amount obtainable from prior methods of crystallizing raw sugar from sugar syrup; the crystals of sucrose formed by the present process are more uniform than those heretofore obtainable, an economy of time, heat and equipment capacity are achieved and less final washings of the sucrose crystals are required to produce sucrose of a given purity as indicated by its specific rotation, all of which advantages will more fully and at length appear hereinafter.

The present process employs certain steps and apparatus known to the art prior to this invention. For example, the present process involves the use of vacuum pans, which in themselves have been known and used long prior to the present invention in this art. These vacuum pans are employed in the present process to evaporate a portion of the water from the sugar solution, and as their name indicates, water is removed from the solution by boiling it under reduced pressure. The vacuum in the pans is such that the solution boils at about 150° F. and not under about 115° F. If the temperature at which sugar solutions are boiled is much over 150° F., say 250° F., it is impossible to obtain the modern glistening and regularly sized crystals of granulated sugar which is now in common use, due to the fact that the sugar is permanently discolored by the employment of high temperature.

It is a characteristic property of sugar solutions that they exhibit a tendency to form supersaturated solutions, and this fact is taken advantage of in the present process.

Reviewing briefly the prior practice of crystallizing sugar from solutions thereof, it is pointed out that heretofore the practice has been substantially as follows: a previously evaporated cane juice containing about 60% sucrose is fed into the first of a series of vacuum pans and boiled until a massecuite is formed, usually employing indirect heating by means of steam coils disposed in the pan or similar heating arrangement. The pan is normally about one-third full during the heating operation and the panman follows the course of the boiling process by the appearance of the solution through the sight glasses or with a "proof stick". When the panman observes that the solution is beginning to "grain", that is, when he observes that numerous baby crystals are beginning to form in the solution, he introduces fresh syrup or gives the solution a "drink". The object from here on is to prevent the formation of more crystals and to increase the size of the original baby crystals by adding more syrup or "drinks" to the pan from time to time. The above process leads to what is known as a massecuite, that is, crystal formation in a mother syrup.

After the boiling is completed in the first vacuum pan, the "massecuite strike" which contains almost normal crystals is introduced into crystallizers which are usually open pans. The "massecuite strike" is permitted to remain in the crystallizers for several hours while being slowly stirred, whereupon the sucrose contained in the mother liquor accretes with the crystals formed in the vacuum pan, enlarging somewhat the original crystals contained in the massecuite. When crystallization is complete, the mixture of sucrose crystals and mother syrup or "first molasses" is separated by centrifuging the same.

It will be obvious to a chemist that under the conditions described above considerable sucrose will be retained in the mother syrup. This syrup is therefore diluted with water and used as original sugar syrup. A massecuite from the first pan is fed into a second vacuum pan of the said series until it contains about one-third of its capacity, and "first molasses" diluted with water obtained from the process of the said first pan is used to fill the second pan, whereupon the process of boiling and crystallizing in the said second pan is thereafter the same as in the first pan to produce a second massecuite strike. The second massecuite strike is crystallized and centrifuged, yielding another crop of raw sugar crystals and "second class molasses".

The second class molasses still containing sucrose is treated in the third vacuum pan in a manner analogous to the process employed in the second vacuum pans except that only one third of its capacity is filled with the massecuite from the first pan, the balance of the pan contents being "second class molasses" diluted with water. The third massecuite strike thus produced is treated in a manner analogous to the first and second massecuites. The molasses obtained from this crop of raw sugar is called "shop-molasses" and is usually not returned to the vacuum pans, but is sold as such.

The general practice of crystallizing raw sugar from thick cane syrup has been described more or less in detail in order to make the following explanation of the present process more understandable and to emphasize the advantages of the present process. At the outset it is pointed out that the present process differs from the prior art methods of crystallizing raw sugar from thick syrup, in that the process is so manipulated that crystallization does not take place in the vacuum pans.

Reference is made to the accompanying drawing, which shows diagrammatically the general arrangement of apparatus suitable for carrying out the present process. Thick syrup containing about 77% to 87% sucrose is introduced into vacuum pan 3 until the latter is approximately one third full. The syrup is boiled under vacuum until the panman observes the formation of a myriad of tiny crystal nuclei, whereupon a "drink" is added from tank 1. The object from here on is to prevent the formation of new crystals, and the panman accomplishes this result by adding more syrup from time to time until the pan is full. The massecuite finally produced has a Brix of about 91 and is discharged while still hot to mixer 12, and immediately thereafter to centrifuges 13 to separate the crystals from the molasses. Upon removing the molasses from centrifuges 13 through the wire mesh cloth in the centrifuges, the molasses drops rapidly in temperature causing the formation of tiny-crystal nuclei which pass therewith through line 14 to crystallizer 17. This element 17 is a new one in the combination and the most important factor of the present invention resides in the phenomenon which takes place in this crystallizer, for it has been observed that the minute and uniform crystal nuclei commence to grow upon the cooling of the magma and reach a convenient size for use as seed crystals for the formation of first class massecuite. The molasses entering this crystallizer has a Brix of about 85 to 87 and is 55% to 70% pure. The molasses is allowed to stand quiescent in this crystallizer from six to twelve hours and is then stirred by a rotating device revolving at the rate of about one revolution per minute, this being done in order to obtain a uniform growth of the minute crystal nuclei.

The molasses magma having been stored in crystallizer 17 as described heretofore, a quantity of fresh syrup is admitted to vacuum pan 3 from tanks 1 until the pan is about one third full, whereupon it is boiled until by density tests the panman observes that crystallization is about ready to commence. The syrup has then a Brix of about 72 to 75 at this time. About 8 U. S. gallons of the molasses magma from crystallizer 17 is then injected into pan 3, whereupon the tendency of the original syrup to form new crystals is prevented. In the process of filling pan 3 with fresh syrup from tanks 1, the minute crystal nuclei contained in the 8 gallons of molasses magma introduced in said pan from crystallizer 17 commence to grow uniformly until reaching a Brix of 88 to 99. When pan 3 is completely filled a portion of its contents is run into pan 4 through line 27, until the pan is about two thirds full. At this time pans 3 and 4 contain thick syrup and seed crystals from 17 which allow continuity of the process. Pan 3 is then filled with fresh syrup until reaching a Brix of 92 and the mixture of concentrated sugar solution containing the seed crystals is then discharged to mixer 12 where as it cools the sucrose separates from the solution and accretes about the crystal seeds. When the solution is cold, it is introduced into centrifuges 13 where sugar is separated from the molasses in the customary manner, obtaining a first crop of raw sugar and a crop of first molasses by the usual process of centrifuging. This first molasses is pumped through line 14 to molasses tanks 18 and has a sugar content of approximately 87 Brix, 52.20% sucrose and 60% purity, is of rather thick consistency and as heretofore stated is called first class molasses. This molasses is diluted with water until the Brix is about 60° and its temperature is maintained at 150° F. with steam from the boilers.

A second crop of raw sugar crystals is obtained from the first class molasses by pumping it through line 24 and branch line 25 to vacuum pan 4, boiling to a Brix of 93 to 94. The molasses thus introduced is used as though it were original syrup to form a second massecuite which is discharged into crystallizers 6 and 7 where it is allowed to cool, discharged therefrom to mixer 12 and into centrifuges 13. The raw sugar is obtained as before and the molasses is pumped to molasses tanks 19 and 20. This molasses is known as "second class molasses" and after diluting it is used in pan 5 for the preparation of a third massecuite. By repeating the same operation heretofore described in pan 3 and introducing a portion of its contents into pan 5, as was done in the preparation of the second massecuite in pan 4, except that the amount in this case is approximately a third of the capacity of pan 5, and then second class molasses from tanks 3, 4 and 5 is pumped through line 24 and branch line 26 until the same is filled whereupon it is concentrated to a Brix of 96. The massecuite prepared in pan 5 is known as a third-massecuite and is formed and introduced into crystallizers 8, 9, 10 and 11, allowed to cool therein, then fed into mixer 21 and finally to centrifuges 22. The molasses obtained from these centrifuges is called "final molasses" or "shop-molasses" and is not returned to the present process, but is sold for use as such. It has been found that the final or "shop-molasses" produced by the present process is of a lower grade than that ordinarily produced because a greater amount of raw sugar is extracted from a given amount of original sugar syrup by the present process than was heretofore obtainable.

It must be noted that the great difference between the new and the old process is that after obtaining the first class molasses in crystallizers 17 and these are used for the preparation of first massecuites, it is unnecessary to use the pan for crystallization.

The specific elements of the apparatus used for carrying the present invention into effect are of conventional design and size. For example, the vacuum pans may be of the Calandria type or other known type. The capacity of the vacuum pans is about 1400 U. S. gallons. The vacuum pans are heated by exhaust steam or direct, while the molasses tanks are heated by direct steam from another step employing steam in this process. The crystallizers, centrifuges and various tanks are likewise of conventional design and capacity. As stated the combination of elements contains a new element, viz., the crystallizers 17, and the presence of this element affords the advantages already stated.

Various substitutions may be made in the arrangement of elements shown or various modifications may be made in one or more elements without in any manner departing from the spirit of the present invention and the present invention is not limited to any specific mode of procedure, except as required by the following claims.

I claim:—

1. In the process of crystallizing sugar from a hot concentrated solution thereof, the improvement comprising forming a massecuite having a Brix of about 91, centrifuging said massecuite while still hot to separate crystals of sugar, withdrawing the molasses to a reservoir, permitting the hot molasses to cool and remain quiescent for an extended period of time to form a molasses magma and adding a small quantity of said magma to a large quantity of hot concentrated sugar solution just prior to cooling of said sugar solution, the molasses magma providing crystal nuclei about which sugar separates from the hot concentrated sugar solution to form normal, uniformly sized crystals of sugar.

2. The process of producing raw sugar in a multi-stage vacuum evaporation system, which comprises first forming a massecuite strike and immediately centrifuging the same, filtering and conducting the filtrate comprising the molasses to a reservoir where it cools to form tiny crystal-nuclei and subsequently seed crystals, and thereafter at spaced intervals of time adding small portions of said molasses magma to hot concentrated sugar solutions in the said evaporation system to prevent the tendency of new crystal formation and to induce accretion of sugar about the pre-formed seed crystals contained in said molasses magma and thereafter recovering the sucrose by cooling, centrifuging, filtering and recycling molasses containing substantial amounts of sucrose, whereby in the complete process a vacuum system of given evaporation capacity is adapted to operate continuously at the capacity of its evaporation system devoted substantially solely to concentrating dilute sugar solutions to effect improved purity and greater recovery of sucrose from a given original cane juice.

ELISEO LUQUE.